(12) United States Patent
Song et al.

(10) Patent No.: US 11,543,568 B2
(45) Date of Patent: Jan. 3, 2023

(54) CAMERA MODULE AND ELECTRONIC DEVICE HAVING THE CAMERA MODULE

(71) Applicant: TRIPLE WIN TECHNOLOGY(SHENZHEN) CO. LTD., Shenzhen (CN)

(72) Inventors: Jian-Chao Song, Guangdong (CN); Jing-Wei Li, Guangdong (CN); Sheng-Jie Ding, Guangdong (CN); Yu-Shuai Li, Shenzhen (CN)

(73) Assignee: TRIPLE WIN TECHNOLOGY(SHENZHEN) CO. LTD., Shenzhen (CN)

( * ) Notice: Subject to any disclaimer, the term of this patent is extended or adjusted under 35 U.S.C. 154(b) by 0 days.

(21) Appl. No.: 17/374,010

(22) Filed: Jul. 13, 2021

(65) Prior Publication Data

US 2022/0091306 A1    Mar. 24, 2022

(30) Foreign Application Priority Data

Sep. 21, 2020  (CN) .......................... 202010997450.8

(51) Int. Cl.
| | | |
|---|---|---|
| G02B 5/00 | (2006.01) | |
| G02B 7/02 | (2021.01) | |
| H04N 5/225 | (2006.01) | |
| G03B 30/00 | (2021.01) | |

(52) U.S. Cl.
CPC .............. *G02B 5/003* (2013.01); *G02B 7/02* (2013.01); *G03B 30/00* (2021.01); *H04N 5/2252* (2013.01); *H04N 5/2254* (2013.01); *H04N 5/2257* (2013.01)

(58) Field of Classification Search
CPC .......... G02B 5/003; G02B 7/02; G03B 30/00; H04N 5/2252; H04N 5/2253; H04N 5/2254; H04N 5/2257
See application file for complete search history.

(56) References Cited

U.S. PATENT DOCUMENTS

| | | | |
|---|---|---|---|
| 2008/0095529 A1* | 4/2008 | Hsu ....................... | H04N 5/2257 |
| | | | 348/E5.025 |
| 2011/0002681 A1* | 1/2011 | Yamashita ....... | H04N 5/232123 |
| | | | 396/133 |
| 2019/0094360 A1* | 3/2019 | Huang .................... | G01S 7/481 |
| 2019/0101718 A1* | 4/2019 | Masuzawa ............ | B60R 25/305 |
| 2019/0319057 A1* | 10/2019 | Wang .................... | H01L 21/565 |
| 2020/0004012 A1* | 1/2020 | Li ....................... | G02B 27/0018 |
| 2020/0096729 A1* | 3/2020 | Kim ........................ | G02B 7/09 |
| 2021/0271154 A1 | 9/2021 | Ding et al. | |
| 2021/0281724 A1* | 9/2021 | Huang ................. | H04N 5/2254 |

FOREIGN PATENT DOCUMENTS

| | | |
|---|---|---|
| CN | 110320729 A | 10/2019 |
| CN | 211378099 U | 8/2020 |
| TW | 200728897 A | 8/2007 |

\* cited by examiner

*Primary Examiner* — Amy R Hsu
(74) *Attorney, Agent, or Firm* — ScienBiziP, P.C.

(57) ABSTRACT

A camera module includes a housing, a lens assembly, and a light-absorbing film. The housing includes a main body and a protrusion or a groove on the main body. The lens assembly includes a lens and a connecting seat. The lens is connected to the connecting seat. A groove or a protrusion is formed on the connecting seat to cooperate with the protrusion or the groove on the main body to connect the housing and the lens assembly. The light-absorbing film is arranged at a joint between the housing and the connecting seat, the light-absorbing film absorbs absorbing light.

16 Claims, 5 Drawing Sheets

CAMERA MODULE AND ELECTRONIC DEVICE HAVING THE CAMERA MODULE

FIELD

The subject matter herein generally relates to a camera module and an electronic device having the camera module.

BACKGROUND

In existing camera modules, a lens assembly of the camera module is generally installed on a base of the camera module with glue. However, light may penetrate into the camera module through the glue, thereby causing light leakage.

BRIEF DESCRIPTION OF THE DRAWINGS

Implementations of the present disclosure will now be described, by way of embodiments, with reference to the attached figures.

DETAILED DESCRIPTION

Figure 1:
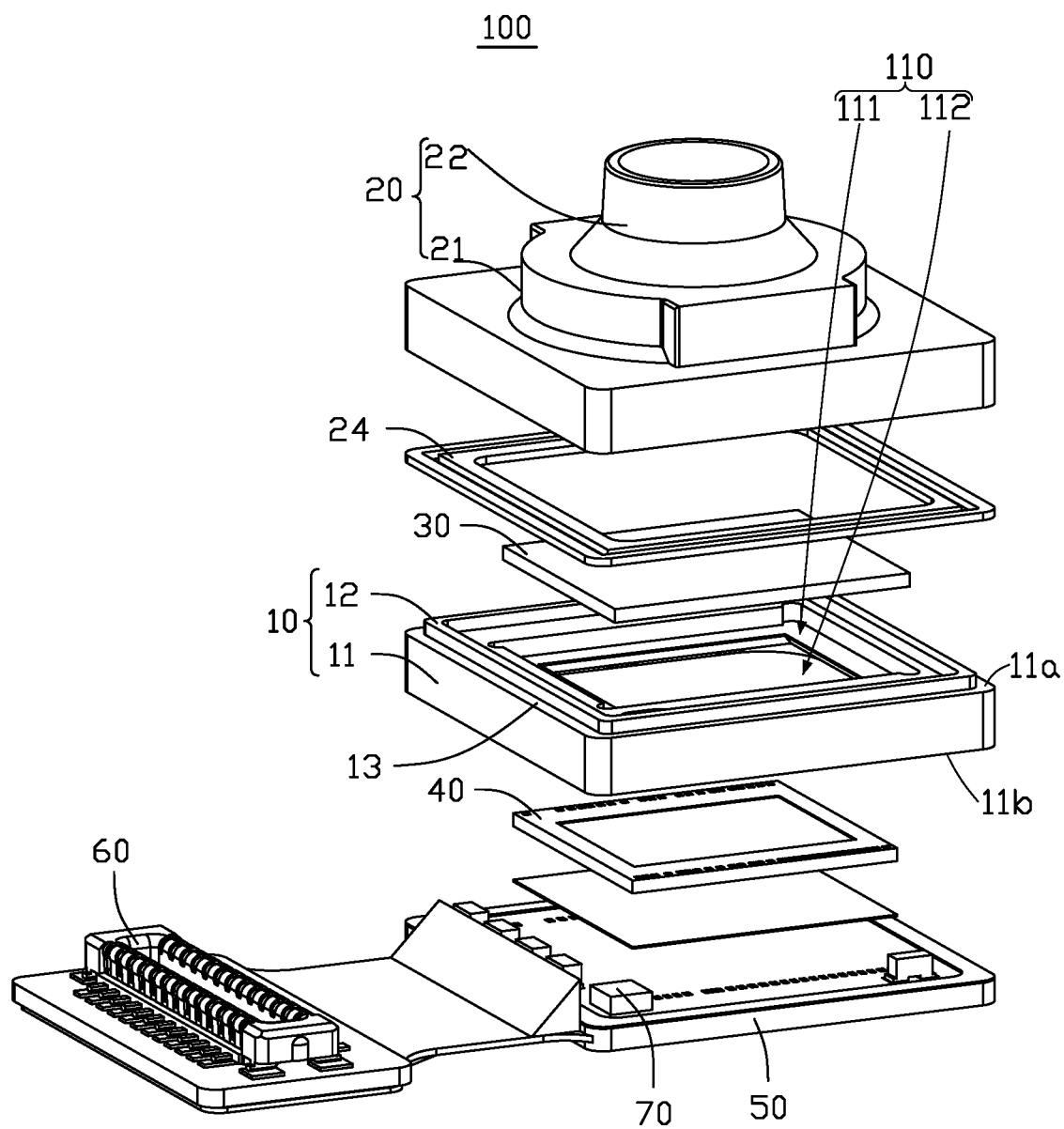
FIG. 1 is an exploded, diagrammatic view of an embodiment of a camera module according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

The term "comprising," when utilized, means "including, but not necessarily limited to"; it specifically indicates open-ended inclusion or membership in the so-described combination, group, series, and the like.

An embodiment of a camera module with a shooting function includes a housing, a lens assembly, and a light-absorbing film. The housing includes a main body and a protrusion or a groove on the main body. The lens assembly includes a lens and a connecting seat. The lens is connected to the connecting seat. A groove corresponding to the protrusion on the main body or a protrusion corresponding to the groove on the main body is formed on the connecting seat to cooperate with the protrusion or the groove on the main body to connect the housing and the lens assembly. The light-absorbing film is arranged at a joint between the housing and the connecting seat for absorbing light.

The camera module is applied in an electronic device. The protrusion or the groove on the housing cooperates with the groove or the protrusion on the lens assembly, and the light-absorbing films is arranged at a joint between the housing and the connecting seat, so that the external light is effectively blocked from the joint to enter the camera module, thereby effectively avoiding light leakage and reducing astigmatism to ensure the shooting effect.

In the following, some embodiments of the disclosure will be described in detail with reference to the accompanying drawings.

FIG. 1 illustrates an embodiment of a camera module 100 applied in a device such as a mobile phone or a computer to achieve a shooting function. The camera module 100 includes a housing 10, a lens assembly 20, a filter 30, and a photosensitive chip 40. The lens assembly 20 is connected to the housing 10, the filter 30 and the photosensitive chip 40 are received in the housing 10.

In at least one embodiment, the housing 10 includes a main body 11 and a protrusion 12 connected to the main body 11. When the lens assembly 20 is mounted on the housing 10, the protrusion 12 is embedded into the lens assembly 20, so that the housing and the lens assembly are tightly connected.

The main body 11 includes a first surface 11a and a second surface 11b facing away from the first surface 11a. A through hole 110 extends through the first surface 11a and the second surface 11b. The protrusion 12 protrudes from the first surface 11a in a direction away from the second surface 11b, and surrounds the through hole 110.

Specifically, the through hole 110 may include a first recess 111 and a second recess 112 communicating with the first recess 112. The first recess 111 is a stepped groove and is recessed from the first surface 11a toward the second surface 11b. The second recess 112 is a stepped groove and is recessed from the second surface 11b toward the first surface 11a. The filter 30 is received in the first recess 111. The photosensitive chip 40 is received in the second recess 112 and converts the light reflected by the object into an electronic signal. In at least one embodiment, the photosensitive chip 40 is fixed in the second recess 112 by dispensing glue. A center of the filter 30, a center of the photosensitive chip 40, and a center of the lens assembly 20 are co-axial, so that the image is clearer.

In at least one embodiment, the protrusion 12 is substantially a rectangular frame. In another embodiment, a shape of the protrusion 12 may be varied as needed.

A light-absorbing film 13 is coated at a joint between the housing 10 and the lens assembly 20 for absorbing light, thereby effectively avoiding stray light and reducing interference to the lens assembly 20. The light-absorbing film 13 may be one or more optical coatings. In at least one embodiment, the light-absorbing film 13 may be coated on the main body 11 to form a black layer.

Figure 2:
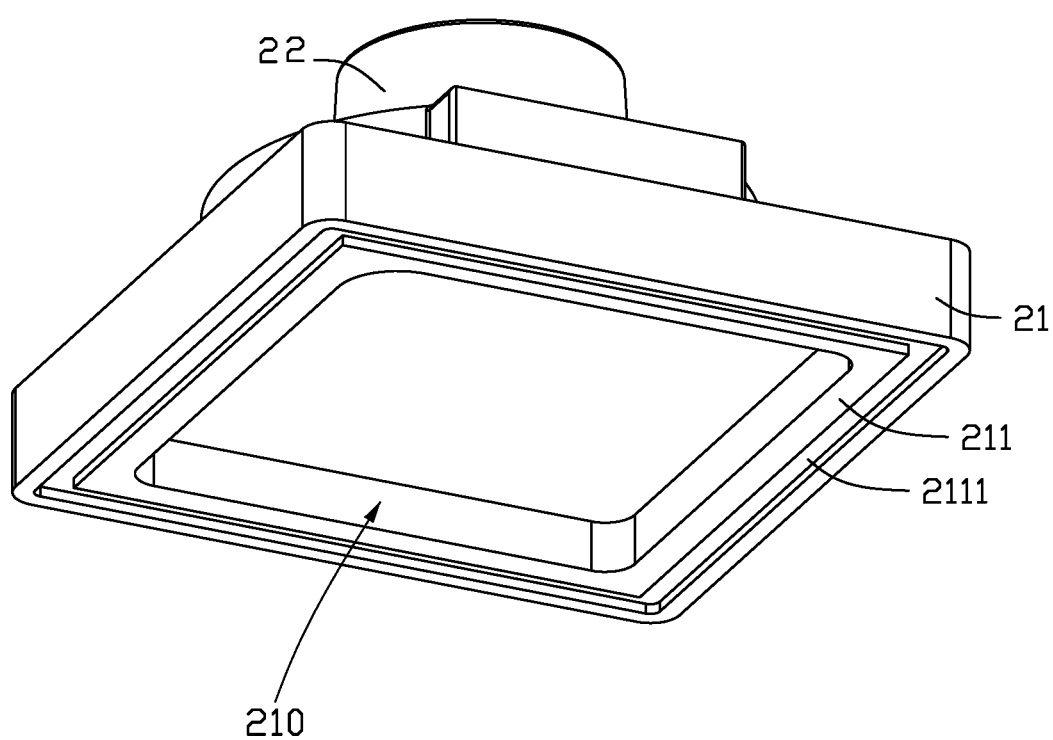
FIG. 2 is a diagram of an embodiment of a lens assembly according to the present disclosure.

Referring to FIG. 2, the lens assembly 20 includes a connecting seat 21 and a lens 22 disposed on the connecting seat 21. The connecting seat 21 includes a first end surface 211 facing away from the lens 22. A receiving hole 210 is recessed from the first end surface 211 for installing the lens 22. A groove 2111 is recessed from the first end surface 211 and surrounds the receiving hole 210. The protrusion 12 is embedded in the groove 2111 to fix the lens assembly 20 and the main body 11.

In at least one embodiment, the groove 2111 is substantially rectangular to cooperate with the protrusion 12. In another embodiment, a shape of the groove 2111 may be changed with the shape of the protrusion 12.

The lens 22 may includes a plurality of lens portions (not labeled) stacked. Each of the plurality of lens portions is a concave lens or a convex lens.

Figure 3:
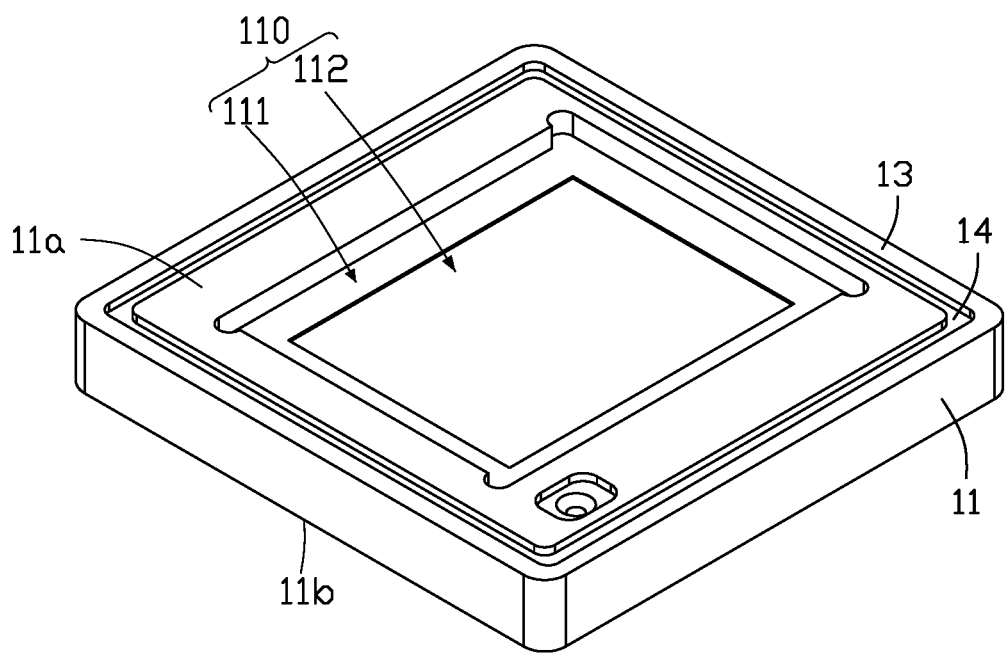
FIG. 3 is a diagram of an embodiment of a housing according to the present disclosure.
Figure 4:
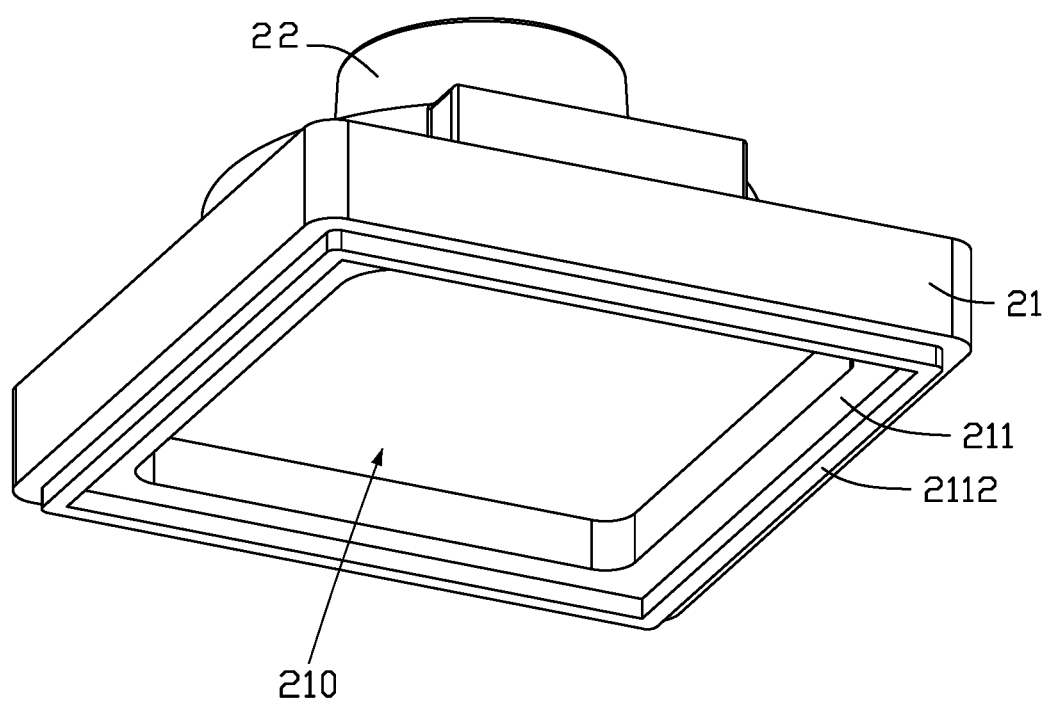
FIG. 4 is a diagram of another embodiment of a lens assembly according to the present disclosure.

Referring to FIG. 3 and FIG. 4, in another embodiment, a groove 14 is recessed from the main body 11. Specifically, the groove 14 is recessed from the first surface 11a toward the second surface 11b, and surrounds the through hole 110. A protrusion 2112 protrudes from the first end surface 211 and surrounds the receiving hole 210. The protrusion 2112 is embedded into the groove 14 to fix the lens assembly 20 and the main body 11. In another embodiment, a shape of the groove 14 and a shape of the protrusion 2112 may be changed as needed.

Referring to FIG. 1, The camera module 100 may further include an adhesive layer 24 located between the housing 10 and the connecting seat 21.

The camera module 100 may further include a circuit board 50, a connector 60, and an electronic component 70. The circuit board 50 is installed on the housing 10 and is electrically connected to the photosensitive chip 40 for providing electrical energy to the photosensitive chip 40. The connector 60 and the electronic component 70 are connected to the circuit board 50. The connector 60 is used for connecting with external components, and the electronic component 70 may be used for processing various electronic signals.

Figure 5:
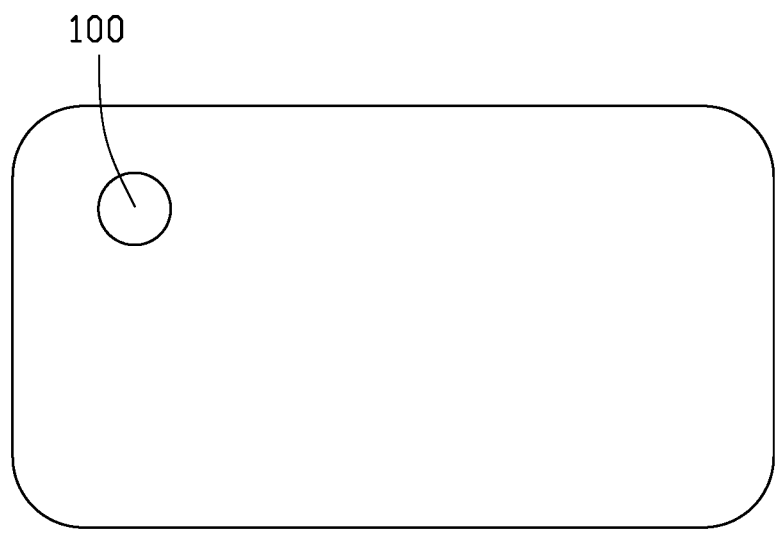
FIG. 5 is a diagram of an embodiment of an electronic device having the camera module of FIG. 1.

FIG. 5 illustrates an embodiment of an electronic device 200 including the above camera module 100. In at least one embodiment, the electronic device 200 may include one camera module, two camera modules or three camera modules.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A camera module comprising:
a housing comprising a main body and a protrusion or a groove on the main body;
a lens assembly comprising a lens and a connecting seat; and
a light-absorbing film;
wherein the lens is connected to the connecting seat, a groove or a protrusion is formed on the connecting seat to cooperate with the protrusion or the groove on the main body to connect the housing and the lens assembly, the light-absorbing film is arranged at a joint between the housing and the connecting seat, the light-absorbing film absorbs light, the main body comprises a first surface and a second surface facing away from the first surface, a through hole extends through the first surface and the second surface; a wall surface of the through hole defines a first recess and a second recess communicating with the first recess, the first recess recessed from the first surface toward the second surface, the second recess is recessed from the second surface toward the first surface, the camera module further comprises a filter and a photosensitive chip, the filter is received in the first recess, the photosensitive chip is received in the second recess.

2. The camera module of claim 1, wherein the light-absorbing film comprises one or more optical coatings.

3. The camera module of claim 1, wherein the camera module further comprises an adhesive layer, the adhesive layer is located between the housing and the connecting seat.

4. The camera module of claim 1, wherein the protrusion on the main body protrudes from the first surface in a direction away from the second surface or the groove on the main body is recessed from the first surface toward the second surface, the protrusion or the groove on the main body surrounds the through hole.

5. The camera module of claim 1 wherein the photosensitive chip is fixed in the second recess by glue.

6. The camera module of claim 1, wherein a center of the filter, a center of the photosensitive chip, and a center of the lens assembly are co-axial.

7. The camera module of claim 1, wherein the first recess is a stepped groove, and the second recess is a stepped groove.

8. The camera module of claim 1, wherein the connecting seat comprises a first end surface facing away from the lens, a receiving hole is recessed from the first end surface, and configured for installing the lens, the groove on the connecting seat is recessed from the first end surface or the protrusion on the connecting seat protrudes from the first end surface in a direction away from the lens, the groove or the protrusion on the connecting seat surrounds the receiving hole.

9. An electronic device comprising:
a camera module comprising:
a housing comprising a main body and a protrusion or a groove on the main body;
a lens assembly comprising a lens and a connecting seat; and
a light-absorbing film;
wherein the lens is connected to the connecting seat, a groove or a protrusion is formed on the connecting seat to cooperate with the protrusion or the groove on the main body to connect the housing and the lens assembly, the light-absorbing film is arranged at a joint between the housing and the connecting seat, the light-absorbing film absorbs absorbing light, the main body comprises a first surface and a second surface facing away from the first surface, a through hole extends through the first surface and the second surface; a wall surface of the through hole defines a first recess and a second recess communicating with the first recess, the first recess recessed from the first surface toward the second surface, the second recess is recessed from the second surface toward the first surface, the camera module further comprises a filter and a photosensitive chip, the filter is received in the first recess, the photosensitive chip is received in the second recess.

10. The electronic device of claim 9, wherein the light-absorbing film comprises one or more optical coatings.

11. The electronic device of claim 9, wherein the camera module further comprises an adhesive layer, the adhesive layer is located between the housing and the connecting seat.

12. The electronic device of claim 9, wherein the protrusion on the main body protrudes from the first surface in a direction away from the second surface or the groove on the main body is recessed from the first surface toward the second surface, the protrusion or the groove on the main body surrounds the through hole.

13. The electronic device of claim 9, wherein the photosensitive chip is fixed in the second recess by glue.

14. The electronic device of claim 9, wherein a center of the filter, a center of the photosensitive chip, and a center of the lens assembly are co-axial.

15. The electronic device of claim 9, wherein the first recess is a stepped groove, and the second recess is a stepped groove.

16. The electronic device of claim 9, wherein the connecting seat comprises a first end surface facing away from the lens, a receiving hole is recessed from the first end surface, and configured for installing the lens, the groove on the connecting seat is recessed from the first end surface or the protrusion on the connecting seat protrudes from the first end surface in a direction away from the lens, the groove or the protrusion on the connecting seat surrounds the receiving hole.

* * * * *